United States Patent [19]

Voellmer

[11] Patent Number: 5,180,259
[45] Date of Patent: Jan. 19, 1993

[54] RETRACTABLE TOOL BIT HAVING LATCH TYPE CATCH MECHANISM

[75] Inventor: George Voellmer, Takoma Park, Md.

[73] Assignee: The United States of America as represented by the Administrator of the National Aeronautics and Space Administration, Washington, D.C.

[21] Appl. No.: 796,496

[22] Filed: Nov. 22, 1991

[51] Int. Cl.⁵ ............................................. B23B 31/10
[52] U.S. Cl. ................................. 408/124; 279/23.1; 279/79; 408/239 R; 408/241 R; 901/41
[58] Field of Search .......... 408/124, 226, 238, 239 R, 408/241 R; 279/23.1, 46.7, 79, 89, 906; 483/901; 901/41

[56] References Cited

U.S. PATENT DOCUMENTS

| | | |
|---|---|---|
| 1,259,603 | 3/1918 | Conord ................................. 279/79 |
| 1,802,053 | 4/1931 | Halborg ............................... 279/79 |
| 1,809,237 | 6/1931 | Halborg ............................... 279/79 |
| 2,324,852 | 7/1943 | Kopcyzinski ........................ 279/79 |
| 2,906,144 | 9/1959 | McManis ............................ 408/124 |
| 3,345,711 | 10/1967 | McCarthy . | |
| 4,242,017 | 12/1980 | DeFazio . | |
| 4,577,837 | 3/1986 | Berg et al. . | |
| 4,616,514 | 10/1986 | Magnussen, Jr. et al. . | |
| 4,826,230 | 5/1989 | Truchet . | |

Primary Examiner—Daniel W. Howell
Attorney, Agent, or Firm—Paul S. Clohan, Jr.; Guy M. Miller; R. Dennis Marchant

[57] ABSTRACT

A retractable tool bit assembly for a tool such as an allen key. The assembly includes one or more spring loaded nestable or telescoping tubular sections together with a catch mechanism for capturing and holding the tool in its retracted position. The catch mechanism consists of a latch mechanism located in a base section and which engages a conically shaped tool head located at the inner end of the tool. The tool head adjoins an eccentric oval type neck portion which extends to a rear lip of the tool head. The latch mechanism releases when the ovular neck portion rotates about the catch members upon actuation of a rotary tool drive motor. When released, all the telescoping sections and the tool extends fully outward to a use position.

16 Claims, 3 Drawing Sheets

RETRACTABLE TOOL BIT HAVING LATCH TYPE CATCH MECHANISM

This invention was made by an employee of the United States Government and therefore may be used by and for the Government for governmental purposes without the payment of any royalties thereon or therefor.

CROSS REFERENCE TO RELATED APPLICATION

This application is related to U.S. Ser. No. 07/656,924, (GSC13-370-1) entitled, "Split Rail Gripper Assembly and Tool Driver Therefor", which was filed in the name of George M. Voellmer on twenty-sixth day of Feb., 1991, and which is also assigned to the assignee of this invention.

FIELD OF THE INVENTION

This invention relates generally to a telescoping type of rotatable tool bit and more particularly to a retractable tool bit driven by a rotary motor used in connection with apparatus for robotically gripping objects.

BACKGROUND OF THE INVENTION

Where there is a need to position and remotely control machinery with a high degree of precision, robots are often used to perform these tasks. Robots in the past have been utilized to perform both simple and complex tasks in various environments, particularly where human activity is inaccessible, prohibited, or relatively hazardous. More recently, robotic type apparatus has been put to use in outer space. Typically where such robots are used, end-effectors are attached to movable robot arms so that objects can be grasped, lifted, manipulated or otherwise operated upon.

In the above cross-referenced related application there is described an end-effector comprised of a split rail gripper assembly comprised of a pair of outwardly extending finger assemblies attached to respective ends of a rack and pinion gear type of rail assembly which is activated by an acme screw driven by a motorized unit coupled to a harmonic drive gear reduction mechanism Between the outward extending finger assemblies there is located a retractable tool bit for an allen key type tool which forms the subject matter of this invention.

SUMMARY

Accordingly, it is an object of the present to provide an improvement in rotatable tool drive apparatus.

It is another object of the invention to provide an improvement in a retractable tool bit.

It is a further object of the invention to provide an improvement in a motor driven retractable tool bit.

And it is yet another object of the invention to provide a retracted tool bit which remains in a retracted state until required in order to economize the work space into which the tool bit would otherwise protrude.

And still a further object of the invention is to provide a motor driven retractable tool bit assembly used in connection with a robotic gripper assembly.

Briefly, the foregoing and other objects are achieved by a retractable tool bit assembly for a tool such as an allen key and comprising, in addition to a relatively larger outer base section, one or more spring loaded telescoping tubular relatively smaller inner extension sections together with a catch mechanism for capturing and holding the tool in its retracted position. The smallest extension section carries the tool and includes a threaded cap. The catch mechanism consists of a spring biased latch assembly located adjacent a base section and which engages a conically shaped head located at the inner end of the tool and having an eccentric oval type neck portion which extends to a rear lip of the tool head. The catch mechanism releases when the neck portion rotates about the latch assembly upon actuation of a rotary tool drive motor coupled to an output flange which rotates the base section. When released, all the telescoping sections and the tool extends fully outward to a use position.

BRIEF DESCRIPTION OF THE DRAWINGS

Other features, advantages and objectives of the invention will be more readily apparent when the following detailed description of the invention is considered in conjunction with the accompanying drawings, wherein.

DETAILED DESCRIPTION OF THE INVENTION

Figure 1:
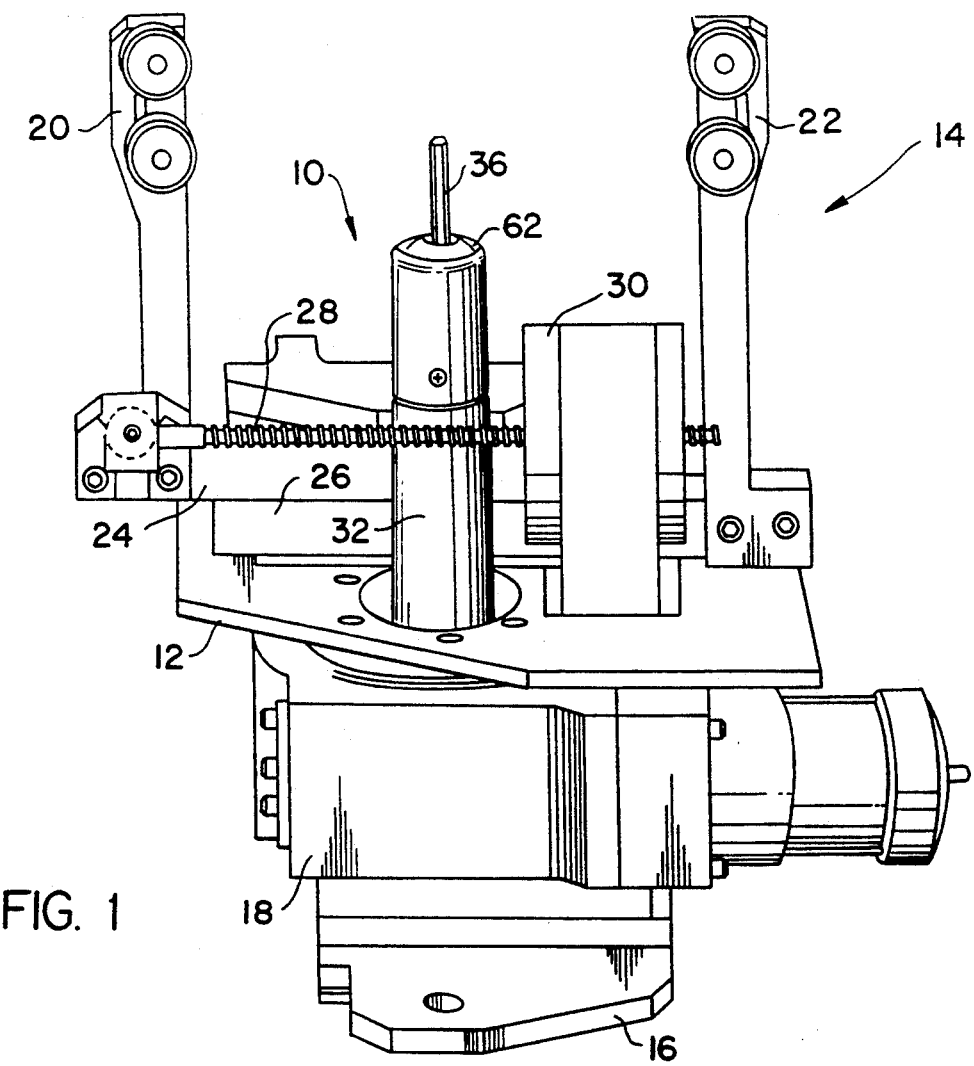
FIG. 1 is a perspective view generally illustrative of a split rail gripper assembly upon which the preferred embodiment of the invention is mounted.
Figure 2:
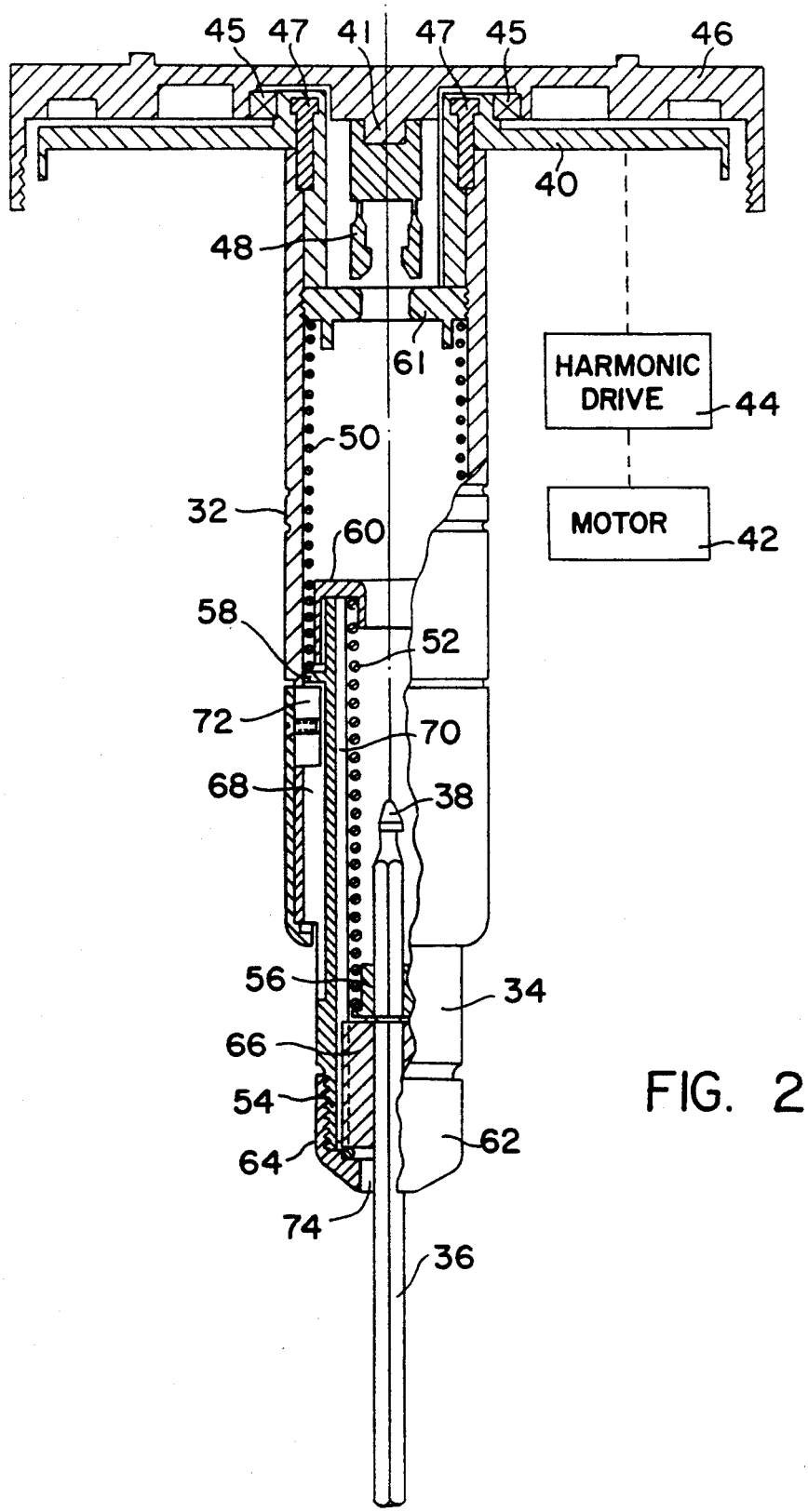
FIG. 2 is a partially cut away central longitudinal cross sectional view of the preferred embodiment of the invention shown in FIG. 1.

Referring now to the drawings wherein like reference numerals refer to like parts throughout, reference will first be made to FIG. 1 wherein there is shown a tool bit assembly 10, the details of which are shown in FIG. 2, mounted on the base plate 12 of a split rail gripper assembly 14. The gripper assembly 14 is disclosed in detail in the above-referenced related application and is intended to be specifically incorporated herein by reference In FIG. 1, the gripper assembly 14 comprises an end-effector for a robotic arm, not shown, and includes, among other things, a robotic arm interface plate 16, an electrical drive motor sub-assembly 18 which drives a pair of outwardly extending roller mounted finger elements 20 and 22. The finger elements 20 and 22 are respectively secured to two elongated rails 24 and 26 mutually interconnected by a rack and pinion mechanism, not show. The two rails 24 and 26 move in mutually opposite directions by means of an elongated Acme screw 28 which is coupled to one of the finger elements and more particularly to element 20, and which is linearly driven through a motor/harmonic drive gear reduction mechanism 30.

In FIG. 1 the tool bit 10 according to this invention is shown in the retracted or parked position, while in FIG. 2 it is shown in the extended or use position. Referring now to FIG. 2, the preferred embodiment of the invention is shown in detail comprising two mutually telescoping tubular sections 32 and 34, with the relatively larger section 32 comprising a base section, and the relatively smaller inner section 34 comprising an extension section which is adapted to hold an elongated tool 36 in the form of a well known allen key, which is adapted to engage a like type socket, not shown but having an offset or eccentric tool head 38 at the base end.

Figure 4A:
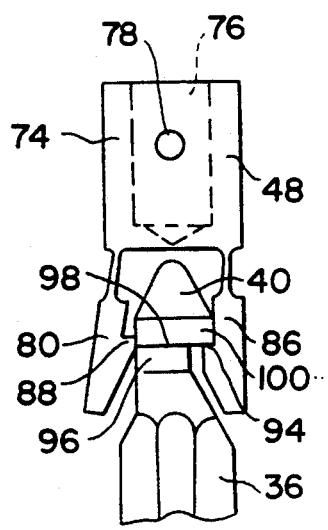
FIGS. 4A–C are illustrative of the spring type tool latch included in the embodiment shown in FIG. 2.
Figure 4B:
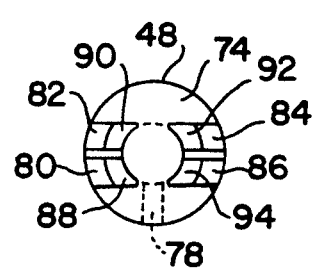
Figure 4C:
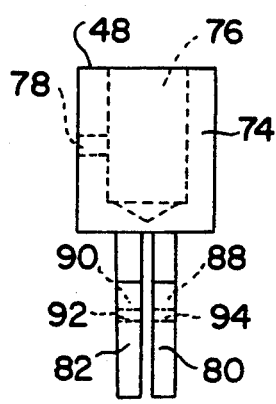

The relatively larger diameter base section 32 is attached to a rotatable output flange 40 which is mechanically coupled to a high speed, low torque drive motor 42 through a second low speed, high torque harmonic drive gear reduction mechanism 44. The flange 40 is mounted on a non-rotating plate 46. A ball bearing assembly 45 is located between the rotatable flange 40 and the stationary plate 46. One or more bolts 47 attach the tubular base section 32 to the output flange 40. All of these elements are located under the base plate 12 (FIG. 1). The plate 46, moreover, includes a centrally located post 41 upon which is positioned a spring type latch member 48, the details of which are shown in FIGS. 4A–C.

The tool 36 and the extension section 34 are spring loaded, i.e. biased, by means of a pair of axially extending compression springs 50 and 52 located within the tubular base section 32 and extension section 34. The tool 36 includes a ferrule 54 along its length which abuts a metal cap member 56 so that the compression spring 52 compresses and expands against the cap member 56 while the compression spring 50 compresses and expands against a shoulder 58 formed on the lower half of the extension section 34 which also includes an end piece 60 and an apertured tool guide member 61 located adjacent the latch member 48. A threaded end cap 62 is affixed to a threaded outer end portion 64 of the extension section 34.

It can be seen that both the tool 36 and the extension section 34 are retractable against the bias of the spring members 50 and 52. Both the ferrule 54 and the extension section 34 additionally include linear keyway grooves 66 and 68 on their outer surfaces which engage key members 70 and 72 on the extension section 34 and the base section 32, respectively, to permit both the extension section 34 and the tool 36 to move axially and not spirally when extending and for transmitting torque to the driven element, not shown, engaging the tip of the tool 36.

Although only one extension section 34 is shown in connection with the base section 32, a plurality of similar smaller extension sections can be implemented in combination with the base section 32 when desired. It should also be noted that the tool 36 has a relatively loose fit in the outer extension section 34 and through the axial opening 74 in the end cap 62 in order to allow the tool 36 a certain amount of lateral compliance. This is due to the fact that since the desired application of this invention is in robotics, small amounts of compliance are important, although it is not essential for the operation of the invention.

This now leads to a consideration of two versions of the spring latch mechanism for seizing and releasing the head 40 of the tool 36 from its parked position as shown in FIG. 1.

The details of the first embodiment of this mechanism, as shown in FIGS. 4A through 4C, consists of a relatively simple device comprising a relatively short base member 74 of generally circular cross section which includes an axial bore 76 so that it can be mounted on the post 41 of the non-rotatable base plate 46. A transverse hole 78 is located in the side of the base 74 to receive a retaining pin, not shown. Extending outwardly from the base 74 are four catch springs 80, 82, 84 and 86 which are arranged in pairs so that, as shown in FIG. 4B, springs 80 and 82 are located diametrically Opposite from the springs 84 and 86. It is significant to note that the springs 80–86 have inwardly facing hook or claw type segments 88, 90, 92 and 94 which operate to catch the head 38 of the tool 36. The hook/claw segments 88 and 90 of the springs 80 and 82 are at a different level, i.e. higher than the hook/claw segments 92 and 94 of the springs 84 and 86. The two pairs of catch springs 80, 82, and 84, 86 are included for redundancy to insure that at least two of the four springs capture the tool head 38.

Figure 3:
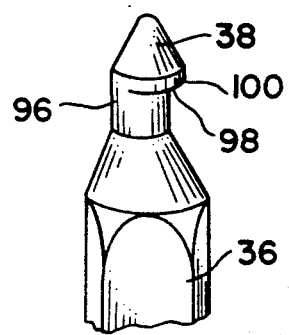
FIG. 3 is a perspective view partially illustrative of the head of the tool shown in FIG. 2.

It is also significant to note that the conical or mushroom shaped head extends from an offset or eccentric ovular neck portion 96. A lip 98 projects from one side of the head 38 as shown in FIG. 3 and is adapted to engage at least one pair of claws 88, 90 and 92, 94. The oval shaped neck region is further shown in FIG. 4A. There the lip 98 is shown engaging one of the edges 92 and 94, while one of the opposing edges 88 and 90 abut the intermediate rim portion 100 between the head 40 and neck 96. When the tool 36 is retracted, the claws catch the head 38. If the eccentric happens to point towards one pair of claws, the other pair will catch it. In operation, to release the tool 36 when the tool drive motor 40 is powered and the tool 36 is rotated, the base 48 does not rotate and the camming action of the eccentric ovular neck portion 96 and rim 100 urge the catch springs outward in pairs such that the springs 80 and 82 move in unison followed by the springs 84 and 86, or vice versa. The hook/claw pairs 88, 90 and 92, 94 are at different levels so that if all four hooks are caught, the tool will drop slightly so that one pair will not relatch when the cam rotates so as to release the other pair. When the head 40 of the tool is released, both it and the telescoping section 34 extend outwardly to its use position as shown in FIG. 2.

Figure 5:
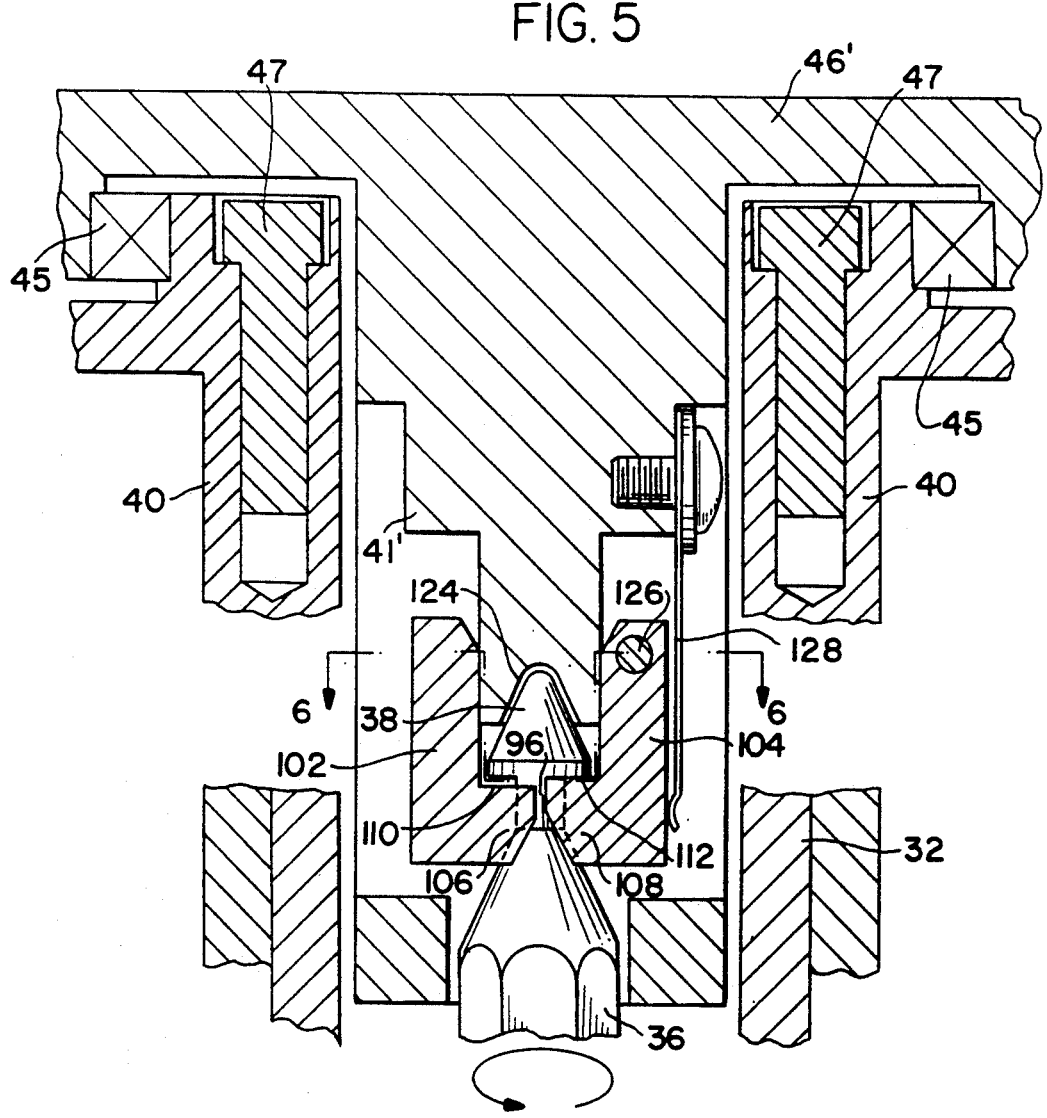
FIG. 5 is a partial central axial cross sectional view of the second embodiment of the latch mechanism utilized in the structure shown in FIG. 2.
Figure 6:
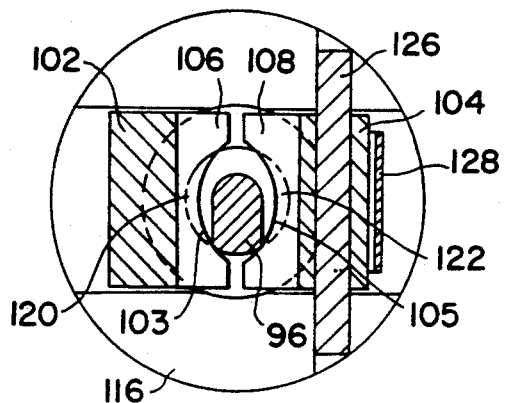
FIG. 6 is a cross sectional view of FIG. 5 taken along the lines 6—6 thereof.

The second embodiment of the catch mechanism is shown in FIGS. 5 and 6 and consists in a pair of opposing L-shaped catch members 102 and 104 which include inwardly facing portions 106 and 108 including respective hook surface portions 110 and 112, with the surface 112 being slightly higher than 110 as shown in FIG. 5. The member 102 is fixed between a pair of stationary side walls 114 and 116 (FIG. 6) of a stationary plate 46' secured to the base plate 12 (FIG. 1). Both L-shaped members 102 and 104 further include semicircular sloped openings which are inclined wall surfaces 103 and 105 (FIG. 6) for receiving and engaging the lip 98 of the tool head 38 from below as shown in FIG. 5 and which resides in a conical bore 124 which is shown in FIG. 6. The L-shaped member 104 is shown pivoted about a pin member 126 but is biased inwardly by means of a leaf spring 128 secured to the post member 41' as shown in FIG. 5.

Concentric with the stationary plate 46' is the motor driven rotatable flange 40 which is supported by the bearing 45 and is thus similar to the structure shown in FIG. 2. As before, the flange 40 is mechanically coupled to the tool 36 through the telescoping sections 32 and 34. Again, with the tool 36 being pushed back into its retracted position, the lip 98 of the tool head 38 is captured by one of the members 102 and 104; however, when the tool drive motor is activated, the tool 36 rotates and causes a relative rotation of the eccentric ovular neck portion 96 which will push the member 104 to the side, releasing the tool 36 in the same manner as described with respect to the first embodiment shown in FIG. 2.

Having thus shown and described what at present considered to be the preferred embodiments of the invention, it should be noted that the same has been made by way of illustration and not limitation. Accordingly, all alterations, changes and modifications coming within the spirit and scope of the invention as set forth in the appended claims are herein meant to be included.

I claim:

1. A retractable tool bit assembly comprising:
at least one rotatable outwardly protruding tool bit holder section;
an elongated spring biased tool mounted for axial movement in and out of said holder section and having an inwardly retracted parked position and an outwardly extended use position, said tool further including an inner end having a grippable tool head thereat;
a hook type catch mechanism located adjacent the holder section and including means for engaging said tool head when said tool is moved to said parked position,
said tool further having an eccentric ovular neck portion adjacent the tool head for releasing the tool head from the catch mechanism when said tool is rotated, whereupon said spring biased tool extends fully outward to said use position.

2. A retractable tool bit assembly comprising:
a rotatable outwardly protruding base section;
at least one coaxial spring biased telescoping extension section mounted for axial movement in and out of said base section;
an elongated spring biased tool mounted for axial movement in and out of said extension section and having an inwardly retracted parked position and an outwardly extended use position, said tool having an adjacent eccentric ovular neck portion further including a grippable tool head at the inner end thereof;
a hook type catch mechanism located adjacent the base section and including means for engaging said tool head when said telescoping extension section and said tool are moved to said parked position,
said tool further having an eccentric ovular neck portion adjacent the tool head for releasing the tool head from the catch mechanism upon rotational movement of said tool, whereupon said spring biased tool extends fully outward to said use position.

3. The retractable tool bit assembly as defined by claim 2 wherein said tool head is generally conically shaped.

4. The retractable tool bit as defined by claim 3 wherein said eccentric ovular neck portion includes an outer surface section coextensive with a lower outer edge portion of the conically shaped head.

5. The retractable stool bit assembly as defined by claim 3 wherein said means for engaging said end portion of said tool includes at least two opposing distending hook members having inward facing head engagement means at mutually different levels relative to a bottom lip portion of the tool head.

6. The retractable tool bit as defined by claim 5 wherein said conically shaped tool head includes a generally flat outer rim surface adjacent said bottom lip portion.

7. The retractable tool bit assembly as defined by claim 5 wherein said hook members comprise spring type members.

8. The retractable tool bit assembly as defined by claim 7 wherein said at least two opposing spring type hook members comprise opposing pairs of hook members.

9. The retractable tool bit assembly as defined by claim 8 wherein respective pairs of said pairs of hook members comprise redundant hook members.

10. The retractable tool bit as defined by claim 9 wherein said hook members comprise generally flat planar members.

11. The retractable tool bit as defined by claim 10 wherein each said hook member includes an outwardly diverging inner side surface for contacting the conically shaped tool head during axial movement of the tool for engagement with said hook members.

12. The retractable tool bit as defined by claim 5 wherein said hook members comprise a pair of generally L-shaped members.

13. The retractable tool bit as defined by claim 12 wherein one of said hook members comprise a spring biased hook member.

14. The retractable tool bit as defined by claim 13 wherein each said hook members an outwardly diverging inner side surface for contacting the conically shaped tool head during axial movement of the tool for engagement with said hook members.

15. The tool bit assembly as defined by claim 3 wherein said base section and said at least one extension section are generally circular in cross section 16. The tool bit assembly as defined by claim 3 wherein said tool comprises an allen key type member.

* * * * *